Nov. 11, 1969

V. C. CRITES 3,477,930

METHOD AND SYSTEM FOR PREVENTING
ELECTROLYTIC CORROSION OF PIPES

Filed Dec. 2, 1965

INVENTOR:
Virgil C. Crites

Attorneys

Nov. 11, 1969

V. C. CRITES

3,477,930

METHOD AND SYSTEM FOR PREVENTING
ELECTROLYTIC CORROSION OF PIPES

Filed Dec. 2, 1965

INVENTOR:
Virgil C. Crites

Attorneys

United States Patent Office 3,477,930
Patented Nov. 11, 1969

3,477,930
METHOD AND SYSTEM FOR PREVENTING ELECTROLYTIC CORROSION OF PIPES
Virgil C. Crites, Los Angeles, Calif., assignor to Lucile Wells Crites, Los Angeles, Calif.
Filed Dec. 2, 1965, Ser. No. 511,077
Int. Cl. C23f *13/00*
U.S. Cl. 204—147                              31 Claims

ABSTRACT OF THE DISCLOSURE

A method and system is disclosed to prevent corrosion in a pipe system exhibiting a difference in electric potential along the flow path. A tubular element is inserted into the pipe system, interrupting current flow through pipe at that location except for current through the liquid passing through the element. An anode is placed into the element and an electric circuit is completed for the anode which includes liquid at more negative potential than the anode. The circuit includes means to raise the potential above the potential imparted upon it by the liquid to obtain a bucking voltage in an environment insulated from the pipes except for liquid conduction. Raising of potential is attained either by selecting the anode material or by connecting an external voltage to the anode.

---

The present invention relates to a method of and a means for preventing corrosion of and/or precipitation in pipes.

Whenever and wherever an electrolytic fluid is transmitted by a metallic pipe and where the pipe connects two different environments two basic troubles are encountered. The first one is precipitation of organic or inorganic materials or both, and the other problem is corrosion. In many instances both problems occur.

Measurements across given spans of the metallic pipe will reveal that electrical current is flowing in or on the pipe. Where the fluid transmitted is electrolytic, it may also be considered a conductor, and thus the pipe and then fluid are conductors which appear to be connected in parallel.

There may be a number of different causes for the generation of this current which is found flowing in and/or on these metallic conductors such as pipes. In chemical plants pipes may convey fluid between an acid environment and an alkaline environment, or in water systems of homes the buried water lines come to the surface and dead end within the home. In such situations there appear to be created conditions analogous to the connection of an external source of electrical energy to the pipe system. Most water lines extend for considerable distances underground thereby traversing different environments and substrata and long line currents exist on these lines.

In oil wells where the tubing conveying the fluid from the well reaches the surface, stress potentials on the tubing hanging in the well are a cause of voltage drop between the tubing and the flow lines conveying the produced fluid to storage tanks. It is well known that when ferrous material is stressed in the open air, i.e., a dry or nonelectrolytic environment the stressed material is positive relative to any similar unstressed material. However, when the ferrous material is stressed in an electrolytic environment and particularly in electrolyte containing sodium chloride the potential shifts to the negative sign.

The magnitude of the potential developed depends on the degree of stress and the concentration of the solution. The average concentration of sodium chloride in brine produced by oil wells in California is about 25% of saturation. Colloids and other dispersed material are generally found to exist in the fluids being conveyed by the pipes all of them possessing a definite electrical charge, and should the pipe be at an opposite potential these materials will be precipitated.

In other instances the pipe tends to assume the same potential as the fluid and particles contained in the fluid; the result is internal corrosion, because particles of the walls of the pipe continue to go into solution as ions and are removed further by electric current flow in the fluid.

In other cases such as water tube boilers the phase change in the fire box results in highly ionized gases which give up their charge to the water tubes causing precipitation of particles contained in the feed water and resulting in hot spots and burned out tubes.

Should a pipeline be broken and a potential measurement made between the broken ends, values up to .7 volt will be found, and if cathodic protection is being attempted on this or other structures in the vicinity of the pipeline, values in excess of 1 volt may be found.

Insulation couplings are commonly introduced into pipelines to break the metallic circuit. Moreover, should the line be conveying an electrolyte the flow of electric current is not stopped as the electrolyte is also a conductor and the current thus continues to flow across the insulation coupling. The charge on suspended particles is not changed and actually precipitation of these charged particles and corrosion is generally increased.

One of the objects of this invention is to provide a simple and effective insulation section to be inserted in a pipeline conveying an electrolyte, the section to be of such construction as to permit the introduction of a counter electromotive force and an electrolytic flow of anions and cations within the insulation for the purpose of opposing the potentials normally existing across the insulation section.

Another object of the invention is to create an ionic field within the insulation section in such a manner as to oppose the ionic field in the solution caused by the normal potential drop across the insulation section.

Another object of the invention is to apply within the solution an ionic field at least equal to the negative force of electrons existing on the negative side of the insulating section so as to oppose the electron flow in the electrolytic solution, and to supply anions at least equal to and opposing those normally existing in the solution.

Another object of the invention is to apply within the solution an ionic field at least equal to and opposing the positive force existing on the positive side and a supply of cations at least equal and opposing those normally existing in the solution. It is thus suggested to establish in an insulating section in the pipe system, a potential barrier which appears to be connected opposite to the external source and thereby inhibits the flow of current through the pipes. As a result of this potential barrier, the potential of the solution and charged particles contained therein entering the pipe on one side of the insulating section is brought in the insulating section to substantially the same potential as the liquid and charged particles would have at the pipe on the other side of the insulating section, if there were electrostatic conditions.

Another object of the invention is to provide a suitable combination of electrical means for altering the release of cations and anions within the fluid body contained in the insulation section and suitable electrical measuring devices to determine when the objectives have been achieved.

Another object of this invention is to provide within the insulation section a galvanic electrode of a potential high in the electromotive force series for furnishing the electrical energy necessary to accomplish the objectives when the broken line potential drop is of an order less than the electromotive force generated by the galvanic action of said anode.

Another object of the invention is to provide a corrosive resistant anode in the insulated section such as a high silicon iron anode energized by an external source of direct current of sufficient potential to accomplish the stated objectives.

Another object of the invention is to provide in the pipeline and the electrolytic fluid therein a pair of oppositely poled batteries so constructed and operated as to permit fluid leaving the pipeline at one end of the valve to enter the line at the other end of the valve but prohibiting electrical current from either entering or leaving the pipeline at either end of the valve.

Another object of the invention is to alter or change the normal potential of suspended particles in the solution being conveyed by a pipeline within the electrically neutral environment of a nonconductive lining or plastic section to eliminate precipitation of said charged particles within the pipeline.

Another object of the invention is to create at both ends of an insulated section introduced into a pipeline a positive field of force repelling the positive force existent at the positive side of the insulation section and creating a positive field on the negative side of the insulating section of such magnitude and for such distance along the pipeline as to at least equal the potentials developed for example by the ionized gases within the fire box of a boiler.

Another object of this invention applied to oil wells which are composed of several different sizes of steel pipes one within the other and different potentials exist on different pipe strings. All the pipe strings are suspended from the surface connection where they join at flanges, the highest stress potentials being developed at the point of suspension. The value and sign of the potential of the tubing string in relation to the casing string being dependent on the fluid being produced through the tubing, and the environment in which the casing is stressed.

In some instances in order to balance potentials between casing and tubing it is necessary to apply a positive field of force repelling the positive force existent on the side of the insulation unit connecting to the receiving or flow tanks and creating a positive field on the normally negative side of the insulating unit connecting the tubing and of such value as to oppose the potential of the casing at the point where the two pipe strings connect at their respective flanges.

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawing in which:

Figure 1:
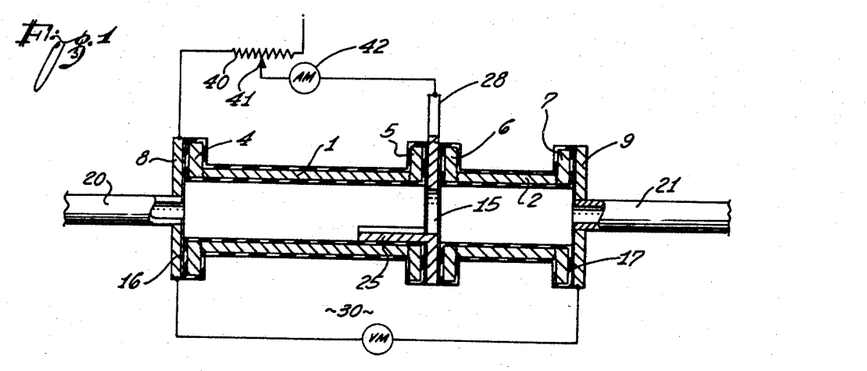
FIGURE 1 illustrates somewhat schematically a cross-sectional view through a corrosion preventing unit in accordance with the preferred embodiment of the invention.
Figure 2:
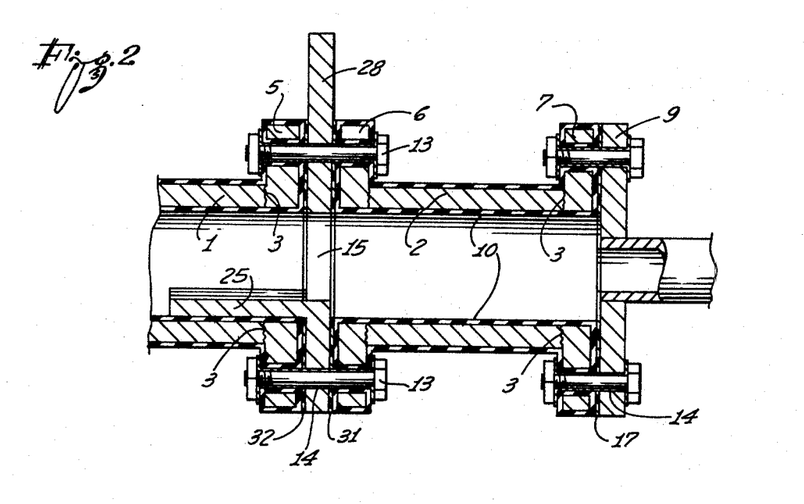
FIGURE 2 illustrates in greater detail a cross-section of a portion of the unit shown in FIGURE 1.

Proceeding now to the detailed description of the drawings, in FIGURES 1 and 2 thereof, there are shown two steel nipples or tubes 1 and 2 respectively. Tube 1 is welded at welding regions 3 to flanges 4 and 5, and tube 2 is welded at welding regions 3 to flanges 6 and 7. The interior of the two nipples or tubes 1 and 2, the faces of flanges 4, 5, 6 and 7 as well as all external surfaces of these elements are covered a coating 10 comprising non-conductive material such as plastic for example of the plastic traded under the designation Penton.

Next there are provided two annuli or disks 8 and 9, both being made of gray iron. The two disks 8 and 9 have circular apertures which are coaxial to the inner, tubular space of steel tubes or nipples 1 and 2. The disk 8 is attached to the outwardly directed face of flange 4, and there is an insulating gasket 16 interposed. Analogously, the disk 9 is connected to the flange 7, and there is an insulating gasket 17 interposed in between otherwise adjoining faces of flange 7 and disk 9.

Bolts such as 13 are being used for connecting the disks to the respective flanges, and the bolts 13 each are received by an insulating tubular sleeve 14 with flanges to insulate bolt head and nut from the respective disks. Also, the tubular sleeve between disk and flange surfaces ensure that bolting will not damage the insulating layer 10. Disks 8 and 9 are not otherwise insulated.

The two steel nipples 1 and 2 are positioned in co-axial relationship with the flanges 5 and 6 facing each other; and there is an electrode 15 interposed in this connection. Electrode 15 is also secured to flanges 5 and 6 by bolts such as 13 and in a manner as aforedescribed. In addition insulating gaskets such as 31 and 32 are interposed to ensure that the electrode 15 is electrically insulated from the nipples or tubes 1 and 2. This is a precautionary measure so that the coating 10 on the face of flanges 4 and 5 will not be abraded or otherwise damaged during bolting.

Figure 3:
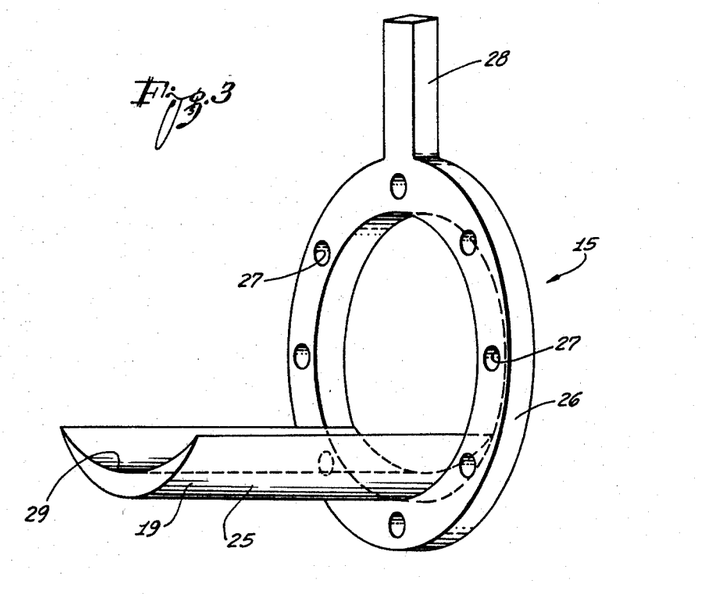
FIGURE 3 illustrates in perspective view an electrode used in the system shown in FIGURE 1.

This electrode 15 is illustrated in greater detail in FIGURE 3; it is comprised of an annulus 26 with apertures 27 to accommodate the bolts for connection, and there is an axially extending tongue having curved surfaces such as 19 and 29 which have parallel axes. Upon mounting this electrode 15 in the position illustrated in FIGURES 1 and 2, the tongue 25 is eccentric to the axis of nipple or tube 1, but the surfaces 19 and 29 have their curvature oriented in an axis parallel relationship to the axis of tube 1. The anode 15 has a radially outwardly extending terminal arm 28 which serves for making electrical connection in a manner to be described more fully below.

The structure as described thus far constitutes a unit 30 which permits passage of fluid from one end to the other whereby the interior space is insulated except for the electrode 15, and here particularly the tongue 25 is exposed for electric interaction with any fluid.

A pipe 20 connects in electrical conductive relationship to the disk 8 in a manner forming a mechanically rigid structure. The pipe 20 pertains to a pipe system passed through by an electrolytic fluid such as a liquid which may subject the pipe to some corrosion. It should be mentioned that practically all liquids produce corrosion sooner or later somewhere in a metallic pipe or pipe system. The unit 30 is interposed into such a pipeline or pipe system which continues at a pipe 21 and which is connected to the disk 9.

The pipes will normally be made of steel. The electrode 15 is made predominantly of magnesium. From a more general point of view, the material of which electrode 15 is comprised should exhibit a contact potential which differs from that established by the disks 8 and 9 and the pipes. In other words, the material of disks 8 and 9 on one hand should differ from the material of electrode 15 within the meaning of the electromotive force series. If, as stated, disks 8 and 9 are made of gray iron, and if the electrode 15 is made of magnesium, then in accordance with the electromotive force series of elements the magnesium electrode exhibits a more negative electrolytic contact behavior as does the gray iron.

It has now been observed that in many cases an electric current passes through a pipe system. If an electrolytic liquid runs through the pipe electric current also flows through the liquid. This means that the liquid carries along negatively charged ions (anions) and positively charged ions (cations). The supply of these ions is continuously replenished by the source which drives current through the pipe system. As the pipes are made of metal, some metal particles are dissolved in the electrolytic fluid as positive ions. The negatively charged ions in the fluid will attract these positive ions from the metallic (steel) pipe surface, reacting therewith and carrying the thus extracted metal atoms along in the liquid. Thus, the pipe will slowly be dissolved because the recombination will result in more pipe ions to enter the electrolytic fluid, and the external source continues to supply anions.

It is important to note that a pipe with an electrolytic fluid constitutes two resistors connected in parallel and having an infinite number of cross connections. The current flow will be distributed between pipe and fluid in a particular and uniform manner as long as the ratio of the cross sectional area passed through by the fluid and of the cross sectional area of the pipe material itself does not vary. Any variation in this ratio produces a current to or from the tube, from or to the fluid, and this results in precipitation and/or corrosion.

For the present invention the nature of this external source which drives this current through the pipe system is entirely immaterial. Often various unrelated causes combine to constitute the particular driving source. Only the magnitude of the driving EMF is important and details here will be considered below. Presently, it may be assumed that the electric current flows in such a manner that the pipe portion 21 leads to the positive potential of this environmental voltage source, while the pipe 20 leads to the negative potential thereof. Positive and negative is here understood only in relation to each other, the zero potential being entirely arbitrary.

Accordingly there is an electric current flow, in the drawing of FIGURE 1, from the pipe section 21 to the pipe section 20. It is clear, that this driving voltage can be measured by stopping the flow of fluid and measuring the voltage between disks 8 and 9. No current will then flow, as the unit 30, when not filled with fluid interrupts the current path.

In order to fully understand the invention, the phenomena involved will be described in some detail. At first it shall be assumed, that no external connection exists between electrode 15 and disks 8 and 9, but it shall be assumed that a fluid such as an electrolytic liquid passes through the pipe. The magnesium electrode 15, particularly the tongue 25 thereof is in direct and immediate contact with the liquid. Some magnesium is dissolved and the tongue 25 is thus surrounded by a cloud of positive magnesium ions while the electrode 15 itself has a negative potential relative to the liquid as it passes the electrode. As long as no further provisions are made, i.e., as long as magnesium electrode 25 is kept in complete isolation this cloud affects only very little the electric current through the pipeline.

The positive magnesium ions will have a potential equal to that of the surrounding fluid because the electrode 15 is otherwise isolated and its potential is negative relative to the potential of the fluid around electrode 15 in the unit 30. More precisely, the potential of the magnesium ions themselves will be equal to that of the cations of the liquid at that spot. There will be some corrosion of electrode 15 as magnesium ions will recombine with the anions flowing in the fluid but the electric current is not changed noticeably. Adjacent disks 8 and 9, in the region of contact with the fluid, there will also be a cloud of positive ions, and the disks themselves will also be negative in relation to the fluid, but less so as is electrode 15 in relation to the fluid. Moreover, the steel pipes and the disks 8 and 9 will react with the electrolytic fluid quite similarly and any differences are negligible in relation to the very different interaction between the magnesium electrode and the fluid.

As the fluid has approximately the same potential near elements 8, 9 and 15, disks 8 and 9 are externally positive in relation to electrode 15, also external to the fluid. Due to the interruption of the pipe, disk 8 will be somewhat negative relative to disk 9, but this potential difference is small in relation to the difference in potential the disks have against electrode 15. However, as the unit 30 interrupts the pipe's electric current path, cations will flow from disk 9 to disk 8, and anions will flow in the opposite direction.

As the fluid is in direct electric contact with the disks 8 and 9 on one hand and with the electrode 15 on the other hand, there are established in effect two electrolytic batteries. Thus, disks 8 and 9 can be regarded as electrodes. The choice of materials suggested has the result that the electrode 15 constitutes the negative terminal or terminals of these two batteries, and the two disks 8 and 9 constitute the respective two positive terminals. Thus, the batteries are oppositely poled and of equal EMF and, therefore, do not contribute to the flow of electric current in the pipes and in the unit 30. For reasons below, it is significant that the open circuit voltage furnished by either battery considered individually is larger than the voltage driving the current of the nature described above through the pipe system.

Now, in accordance with the present invention, it is suggested to interconnect electrode or disk 8 with electrode 15 at the arm 28 thereof by means of a resistor 40. Ultimately, this resistor 40 can be a fixed one, but in order to provide for the particular counter EMF needed to interrupt the current in the pipe system, the initial installation requires at least temporarily an adjustable resistor. Thus, resistor 40 is shown here with an adjustable glider or tab 41. Resistor 40 serves as adjustable load for the battery established by electrodes 15 and 18; the second battery established by electrodes 9 and 15 is left in open circuit.

Consider first a rather large resistance 40, for example, the full value thereof connected across electrodes 8 and 15, then only a small current is driven into the load which means that only a small amount of electrons flows off (externally) electrode 15 to electrode 8. Correspondingly, only few electrons migrate on the return path through the fluid to recombine with positive ions around electrode 15, and only few positive ions enter the liquid from the electrode 15, particularly from tongue 25. The potential distribution in the fluid as well as between electrodes 15 and 25 and be changed very little.

Consider now the opposite situation, that electrodes 8 and 15 are connected directly to each other thus drawing a very large load current from this battery. This results in an enforcement of almost similar potentials between electrodes 8 and 15. Internally, i.e., within the fluid, the positive ion cloud surrounding electrode 15 has a relatively large potential difference against electrode 15, the ion cloud around disk 8 has a smaller potential difference, so that now a potential difference is impressed in the fluid contained in pipe 1, with the fluid region around electrode 15 being more positive. In other words, the electrode 15 is now externally forced to assume a particular potential, so that the dissolved magnesium ions impart upon the fluid region adjoining electrode 15 a much higher (more positive) potential as resulting previously, due to the current from the external source.

Electrode 8 is connected to pipe 20 and thus is maintained at similar potential. The pipe 20 is assumed to run from the more negative side of the external EMF driving source and pipe 21 to the positive side thereof. The insulated unit 30 interrupts this circuit connection as far as the pipe system itself is concerned, and the internal field in the fluid as between electrodes 8 and 15 is a potential barrier for any current from the external source. Moreover, the connection between electrodes 15 and 8 effectively lowers the potential of electrode 8 it would have otherwise, so that the long line current in pipe 20 itself is interrupted. Thus, the device operates as an internal switch, that disconnects pipe 20 and the liquid therein from pipe 21 and the positive potential of the external source.

At this situation, it is quite possible that the potential of the fluid around electrode 15 is higher (more positive) than the positive potential of the external source at pipe 21 as it was assumed that there is an external short circuit between electrodes 8 and 15. The potential of the fluid around electrode 15 depends on the material selected for electrode 15. It is obvious that the potential difference between the fluid at electrode 15 and the electrode 9 will be larger the farther apart are the materials for the electrodes in the EMF series. A potential drop in the fluid along pipe 2 will result in a flow of electrons and anions from electrode 9 and pipe 21 towards electrode 15 and a flow of positive ions towards electrode 9. This is the internal current in this battery 9–15, and a closed circuit may be established externally through pipe 21 and the fluid therein, the external source, back into pipe 20 and the fluid therein and through interconnected electrodes 8–15 to the latter. This current path would be driven from the potential difference between electrodes 15 and 9 (externally).

Such current is undesirable because the principal objective of the invention is the prevention of any current flow regardless of the source of such a current. Thus, the potential of the positive ions in the fluid around electrode 15 should equal the potential of the ions in the fluid adjacent electrode 9 and pipe 21. If this is the case, no current will flow into or out of electrode 9. These conditions are established by selecting a suitable position of tape 41 on rheostat 40. Such a position will differ from case to case depending upon the strength and type of the external driving potential. The latter may vary in time and, therefore, occasional readjustment of the rheostat may become necessary.

How can this optimum condition really be found. Assuming again the resistor 40 be fully connected across electrodes 8 and 15, a small current will flow in the load circuit. As the tap 41 is moved to reduce the load, the current will increase as can be noticed in an amperemeter 42 being passed through by the load current. This current increase will be linear to a substantial degree, assuming a linear rheostat is being used and assuming further that the adjustment is made rather uniformly or in uniform steps. As the current in resistor 40 increases, the current drive from the external driving source into the pipes will gradually be reduced.

However, upon decreasing the effective load resistance, the potential of the fluid around electrode 15 increases towards the positive, which operates as a counter EMF for the flow of positive ions from electrode 9 towards electrode 15. Thus, the current provided by the external source will be reduced so that the potential of the pipe 21 necessarily goes up. At the instant of interruption of the current from the external source, there will be no potential difference in the fluid along pipes 2 and 21 and the only potential difference between pipe 2 with electrode 9 and the fluid is the contact potential difference as between the material of the pipe (steel) and the electrolytic fluid at electrostatic conditions.

If now the load 40 is reduced further, the potential of electrode 9 and of the adjoining fluid stays fixed, but the potential of electrode 15 increases towards still more positive values and now the assembly 15–9 with contacting fluid becomes operative as a battery and a return path current will flow (cations) from electrode 15 to electrode 9. The load circuit for this battery runs through pipe 21, the external source pipe 20, electrode 8 and branches there so that most of the current passes through rheostat 40 and amperemeter 42.

Thus, the prior linearity of the change of the load current is disrupted and the load current will increase rather suddenly or at a steeper upward slope as before. This will depend on the inner resistance of the external driving source. In any event, a definite change in the current characteristics through rheostat 40 is observable and that is the instant in which the counter EMF of the system produced in the fluid equals the EMF of the external source.

It should be noted, that upon decreasing the resistance in the external circuit between electrodes 8 and 15, the voltage will increase up to the value of the external driving source voltage. This value may be unknown previously, but can be detected, in that further reduction of the load in the circuit 8→15 will not cause any further increase. Moreover, if the battery 15–9 takes over as driving source, the voltage between electrodes 8 and 9 should decrease again. Thus, a jump in the load current and a voltage maximum across unit 30 both indicate the proper load and balancing of the external driving source. At the instant of this adjustment there is a more or less uniform potential in the liquid along pipe 20, a potential increase in section 1 and uniform potential again through section 2 and pipe 21.

Figure 1A:
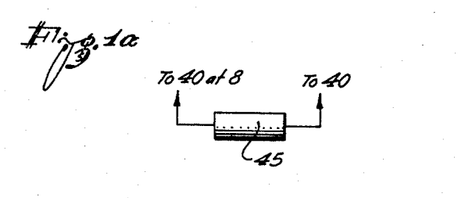
FIGURE 1a illustrates a supplementing unit for the unit shown in FIGURE 1.
Figures 1B, 6A:
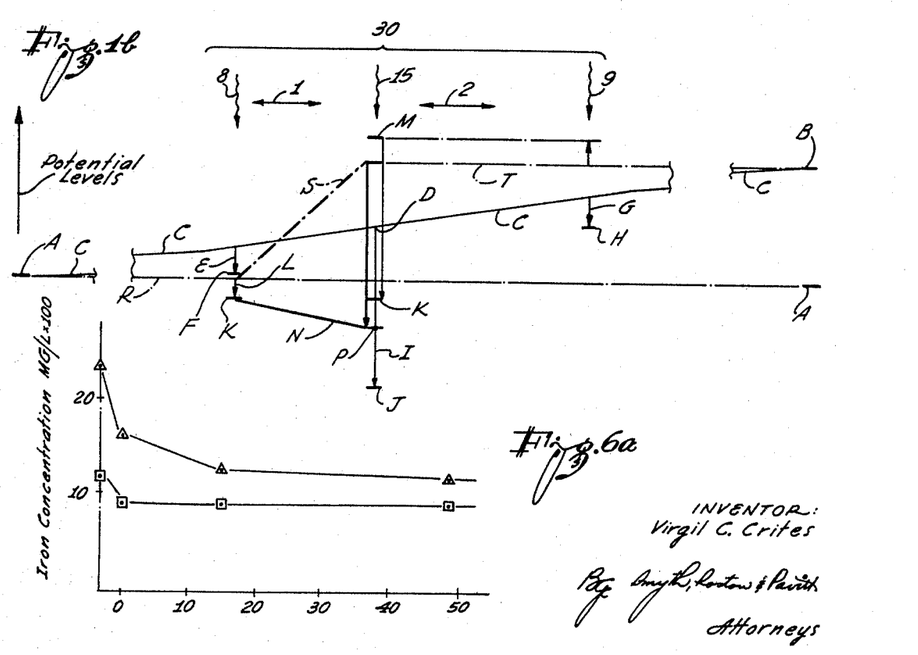
FIGURE 1b illustrates a potential level diagram for various operating conditions of the unit shown in FIGURE 1.
FIGURE 6a illustrates a graph showing the change in concentration of iron as measured before and after a unit shown in FIGURE 6 was installed in a household water supply line.

FIGURE 1b illustrates the potential distribution, somewhat simplified as it exists in the pipe system. Let A be the potential level as established by the external driving source as the relative negative potential, remote from unit 30, and B is the correspondingly remote, more positive level. Then the driving voltage for the corrosion and precipitation producing current is A–B. These levels are presumed to exist in the fluid. Assuming a more or less uniform diameter of the pipes, density of charge carriers, etc. then without operative compensation by unit 30, line C denotes the potential drop in the fluid in the pipe system including unit 30, and resulting from the current supplied from the source which establishes levels A and B. The slope may be slightly exaggerated to simplify explanation, particularly because the length of unit 30 in the entire pipe system will be comparably small. However, the steel pipes 20 and 21 are better conductors than the fluid, so that the voltage drop per unit length is smaller in pipes 20 and 21 than in unit 30 wherein electrical conduction runs only through the fluid. This accounts for the change in slope of curve C. More particularly, due to the fact that unit 30 interrupts the current path established by the pipes themselves, the current distribution changes near disks 8 and 9 in that current flows into the fluid at disk 9 and out of the fluid at disk 8.

As the electrode 15 is inserted (but not connected externally), the ion cloud around has as reference potential the level D established by the characteristics C.

Vector E points to the more negative potential level F electrode 8 assumes as the result of its contact with the fluid, and a vector G denotes the establishing of the external potential level H of electrode 9. As electrodes 8 and 9 are assumed to be made of similar materials, arrows E and G are equally long. This is not absolutely correct as electrode 9 supplies cations to the fluid, while cations flow to electrode 8, anions flowing in the opposite direction, because the current normally flowing in the pipes has to bypass the insulation.

The flow of cations and anions past electrode 15 has little influence on the ionic field set up by the magnesium ions enveloping the electrode 15. Vector I points to the considerably larger negative potential J assumed externally by the magnesium electrode 15. It should be noted, that the absolute length of either vector E, G or I in relation to the difference A–B is immaterial as only the difference in length of vector I and vector E or G is material, and that difference is illustrated here approximately in proper proportion. F–J is the external battery voltage established by electrode system 8–15, and J–H is the battery voltage of the system 15–9, without load in either case.

If one short circuits electrode 8 and 15 externally, and if one assumes that the internal impedance of the source A–B is high as compared with that of the pipe line, then level A is enforced in the fluid adjacent electrode 8, externally establishing level K pointed to by vector L, being somewhat shorter than vector E because of the load conditions imposed upon the electrode-fluid system. Level K now must be the same externally for electrode 15 due to external short circuit of electrodes 8 and 15, thereby boosting the internal potential of electrode 15 in the surrounding fluid up to potential level M; arrow M–K being somewhat shorter than arrow L. As level M is more positive than level B, battery 9–15 operates as driving source in the reverse and with voltage M–B as driving voltage. Hence, positive ions at potential level M will now be driven also towards the more negative electrode 9.

By connecting a load (resistor 40) of optimum adjustment value between electrodes 8 and 15 (externally), a voltage drop N appears between the electrodes 8 and 15 establishing a level P externally for electrode 15, so that internally level B is established in the fluid around electrode 15. The dotted line R–S–T now illustrates the situation for complete compensation with line R running along level A in the pipe 20; S is the potential gradient produced internally in insulated tube 1, and line T is at level B through section 2 and pipe 21. Thus, there is no electric field which could drive ions from or to electrode 15, to or from electrode 9. Also, the electron flow from electrode 15 (externally) into electrode 8 causes the potential to equalize along pipe 20.

It can thus be seen, that by adjusting resistor 40, the slope N is varied, and this in turn varies the total potential drop S as internal operating barrier against the voltage A–B. For a particular pipe system, the potential difference A–B is externally determined, the electrolytic voltage E or L is more or less fixed by the material chosen for the pipes. Thus, $$|\overrightarrow{A-B}|+|L|$$

is a value determining the operating conditions. Obviously, voltage I must be larger than this given value, so that the voltage drop $(K-P)$ across the load can be used to establish the condition $$|\overrightarrow{A-B}|+|L|=|I|-|\overrightarrow{K-P}|$$

Thus, the material for electrode 15 must be selected so that its electrolytic contact potential I can be subjected to an adjustable potential drop $(K-P)$ in the load to satisfy the particularly existing conditions. As the fluid passes from pipe 20 into section 1, the fluid is "run up" the potential slope S, and traverses section 2 in neutral environment.

Thus, the pipe system is electrically interrupted by the insulated unit 30, and the electrode system sets up in the fluid a drop in potential which actually raises the electrical potential (or lowers it, depending on the direction of flow of the fluid), so that the fluid when leaving again the insulating section has the potential electrostatically present as between the pipe material and the fluid thereat. Therefore, the pipe and the fluid is maintained throughout at electrostatic equilibrium thereby preventing corrosion and precipitation.

It can thus be seen that when this particular unit 30 is inserted in a pipeline a potential drop can be recorded as being set up between the pipe sections 20 and 21 because they now are suddenly isolated from each other due to the several insulations as provided. The only electrical connection between pipes 20 and 21 through the electrolytic fluid is the fluid in unit 30 which in section 2 is maintained at a constant potential thus barring the flow of any current.

We must consider in detail what happens to the phenomenon of precipitation. It can be seen that when the ionic field surrounding the electrode 15 equals the field created by the section 21 as it is electrically connected to the electrode 9, the solution as it flows through the unit 30 and from a point where it passes the anode 25 until it enters the electrode 21 has impressed upon it substantially the same potential as it exists adjacent the electrode 9. Any suspended ionized particles in solution are not electrically precipitated for the simple reason that their potential is altered in the insulated section of the pipe coated with an insulating material, and the plastic cover 10 presents an electrically neutral environment incapable of holding such material. By the time the particles reach the uninsulated section of the pipeline, for example, section 21, they are of the same potential the liquid would be at that section in the absence of flow.

In the embodiment of the present invention as described thus far, the counter EMF was set up internally by unit 30 without requiring an auxiliary source. Of course, the operation of the unit will result in some corrosion of the electrode 15 as there is a continuous going-into-solution of magnesium. A rather strong continuous current runs in the pipe 1 (see steep slope S in FIGURE 1b). This requires occasional exchange of the electrode. Nevertheless in between such exchanges, the unit itself does not require any maintenance, nor is it subject to equipment failure as it is particularly not dependent on a particular external power source. The unit will cease to function when the pipes are empty, but then no internal counter EMF is needed.

On the one hand, there may be cases where the necessity of an exchange of the electrode cannot be tolerated or proves exceedingly cumbersome, but where on the other hand an external auxiliary power source is preferred even though some maintenance is required. This leads to the description of an alternative embodiment which actually is incorporated in FIGURE 1 if taken in connection with FIGURE 1a. This modification suggests utilization of an auxiliary power source 45 furnishing an adjustable, constant potential.

This voltage source 45 should not vary the voltage it furnishes with any change in current flowing through it. This source 45 is connected across the total amount of the resistor 40 as is suggested by legend in FIGURE 1a. The electrode 15 can now be made of a material having exactly the same electrolytic contact properties as has the electrodes 8 and 9. Silicon steel was found suitable. The potential of the liquid adjacent electrode 15 is adjustable by tap 41 of rheostat 40. The desired conditions are established again when no potential drop exists across section 2 and a measurement to this extent can be used to adjust the particularly needed electromotive counter force under the circumstances. The adjustment to optimum conditions is otherwise similar as aforedescribed.

As long as the potential at electrode 15 does not exceed that at electrode 9, the current through the pipes is not interrupted. When the potential at electrode 15 exceeds the value necessary for interrupting the pipe current, the pipe system becomes a parallel circuit path as between electrodes 8 and 15 and again a current jump will be observed at the critical point of rheostat adjustment.

It should be mentioned that tests have been conducted and it was found that in using this particular way of balancing the external electric power source in the pipe system, one will observe that after some time rheostat 40 has to be readjusted, due to some polarization in this electrode system. However, this is only a matter of efficiency of the operation of the system. Several hours, at most a few days, after the initial installation, readjustment may be advisable, but thereafter no further change is required.

A remark is necessary here as to the fact that electrode 15 is mounted insulated from either pipe, except for the connection through the liquid and the rheostat 40. The main reason for this is the creation of a potential-drop-free region in an insulated pipe section, here section 2, while pipe section 1 is used to set up the potential barrier. In the first embodiment the potential drop free pipe section 2 is essential to provide a definite circuit path separation so that no bypass of any pipe current is possible.

In the embodiment of FIGURE 1a, one could use an external counter EMF connected directly between pipes 20 and 21, i.e., electrodes 8 and 9, with a single insulated tube in between, provided this auxiliary source with its adjustment portion has a very high inner ohmic resistance, so that such a source would not operate as a bridge across the insulated pipe. As this is difficult particularly with regard to the necessary adjustment, it is preferred to provide an insulated pipe section, such as tube 2 to establish a potential drop free fluid zone for separating electrode 15 from pipe 21.

Figure 4:
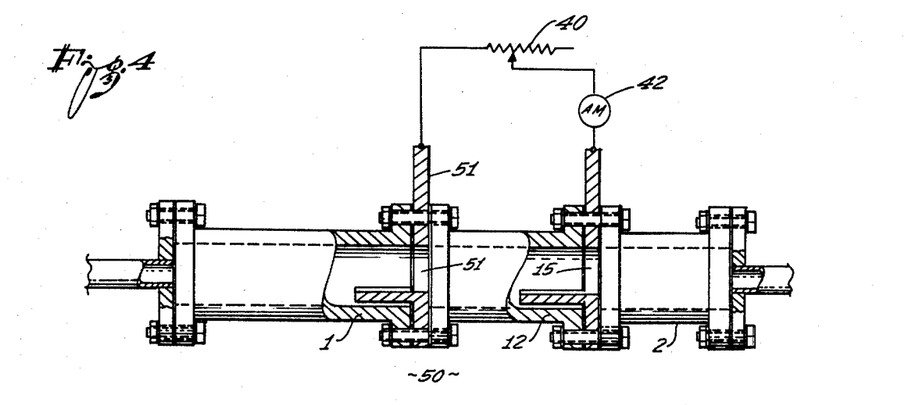
FIGURES 4, 5, 6 and 7 respectively illustrate somewhat schematically cross-sectional view through four structurally different embodiments of the invention.

FIGURE 4 illustrates a modification of the invention in which a unit 50 to be installed between the pipeline sections 20 and 21 is triparted. There is again the electrode 15 being, for example, a magnesium electrode as suggested above. Electrode 15 is mounted in between pipe section 2 and a section 12, to which in turn is mounted a second electrode 51. Electrode 51 connects with its other side to pipe section 1. Electrode 51 has a configuration similar to electrode 15, but it is made of iron or any other material more to the positive side of the EMF series. Electrodes 15 and 51 provide a battery which is bridged by the adjustable load resistor 40. The system otherwise establishes these conditions.

Electrodes 51 and 15 establish a battery and upon adjusting the load resistor 40 to the critical value, a potential drop is established in the fluid contained in section 12. This drop runs from the constant potential of the fluid in section 1 to the different but also constant potential in section 2. If the integrated slope in section 12 equals the external voltage (A–B in FIG. 1b), sections 1 and 2 each are kept at a uniform potential indeed, decoupling the battery system from the pipe system and establishing the counter EMF in a totally insulated environment, as the uniform potential in sections 1 and 2 is in effect an insulator. As electrodes 51 and 15 are, externally, insulated from electrodes 8 and 9 and pipe sections 1 and 2 are insulated from each other so that the problem of leakage paths is thus further reduced here and the rate of consumption of the electrode serving as anode of the battery (15) is reduced.

The systems illustrated may prove cumbersome when the electrode 15 has to be exchanged because of corrosion. Therefore, the units shown in FIGURE 5 and others are structurally of greater advantage as far as the exchange of electrodes is concerned. However, the mode of operation is the same for all these cases. The embodiment shown in FIGURE 5 has an insulating unit 70 a double sweep cross, inserted in between the pipe sections 20 and 21. This unit is permanently installed and does not have to be taken apart for electrode exchange.

Figure 5:
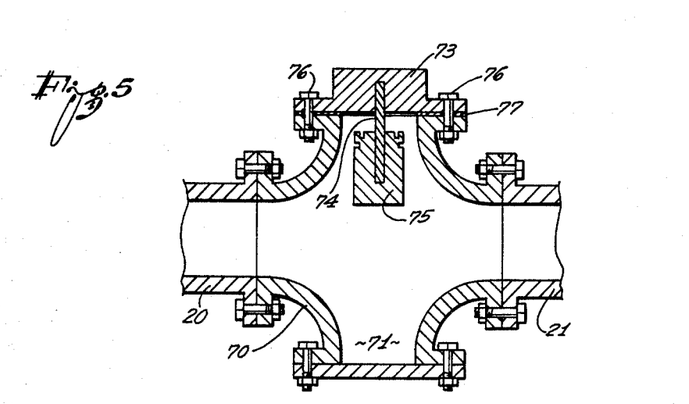

The entire interior of this double cross 70 is electrically insulated, for example, it is coated with plastic. An outlet 71 of the unit is closed by a blind flange 72 which is bolted to the unit and serves as a support. This connection may also be a permanent one, as it does not require loosening for electrode exchange. The interior of flange 72 is also covered with an insulating coating.

The upper outlet is closed by means of a cover structure 73. The magnesium electrode, here denoted with 75, is suspended from the cover 73 by means of a steel rod 74 to project into the interior of the unit 70. Bolts 76 which are indicated only schematically, secure cover 73 to an upper flange of unit 70 in a manner which permits loosening so that electrode 75 can be lifted from the interior of unit 70 after the bolts have been removed. The rod 74 is threaded and screwed into this cover plate 73. Rod 74 is also covered with an insulating coating. The magnesium electrode 75 to be used can be made of a casting, or can be made by casing a magnesium alloy containing about 4% aluminum. This material is being cast around the steel rod 74. Here it is an interesting phenomenon that there will be no corrosion at the threaded joint between the bolt or rod 74, as it is screwed into the plate 73, because the joint will be cathodic in relation to the magnesium electrode.

The raised top of the cover plate 73 can be used for supporting the resistor. It is, of course, essential that an insulating layer 77 is interposed between the metallic plate 73 and the upper flange of the metallic double sweep across 70 so that the electrode is indeed electrically insulated completely from the pipe sections 20 and 21 except for the connection resulting from contact with the electrolytic fluid.

Figure 6:
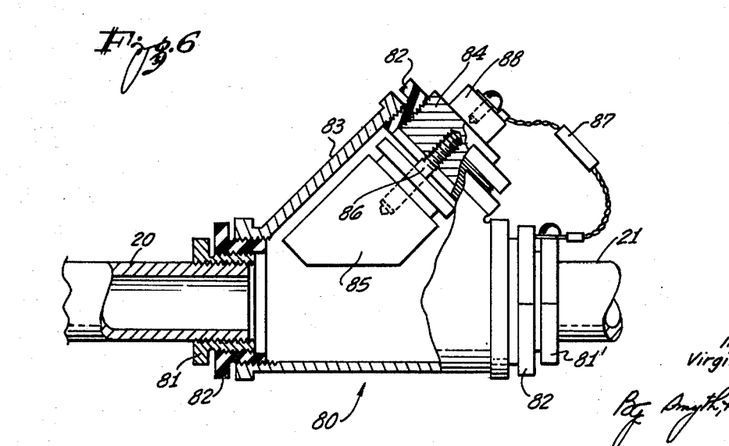

In FIGURE 6 there is another unit 80 which likewise suggests itself as being of advantage with regard to an exchange of a corroded and consumed magnesium electrode for a new one. The unit 80 is permanently connected between pipes 20 and 21, there are reducing bushings 81 and 81' and insulating bushings 82 interposed between the pipes 20 and 21. The unit 80 has an upwardly extending nipple 83 the axis of which is inclined by about 45° relative to the common axis of the pipes 20 and 21. The open end of nipple 83 is closed by means of a metallic plug 84, there being also an insulating bushing 82. An electrode 85 projects inwardly from the plug 84. The electrode is made of magnesium and connected to plug 84 by means of a rod 86 which is covered with insulating material. The entire interior of the unit 80 is covered by an electrically insulating material. Plug 84 carries a terminal 88 for external access and an adjustable, preadjusted resistor 87 connects the terminal 88 to bushing 81'. It can readily be seen that the operation of this unit is analogous to the operation of the units outlined above.

FIGURE 6a illustrates the effectiveness of a unit as shown in FIGURE 6, before and after installation in a household water supply system. The change in iron concentration in the hot and cold supply lines is shown separately. A magnesium electrode without auxiliary external source was used. The values plotted along the ordinate line represent the concentration before the installation of the unit, and the next set of values for abscissa value zero are the concentration measured immediately succeeding the installation. The abscissa then shows days as scale value.

Figure 7:
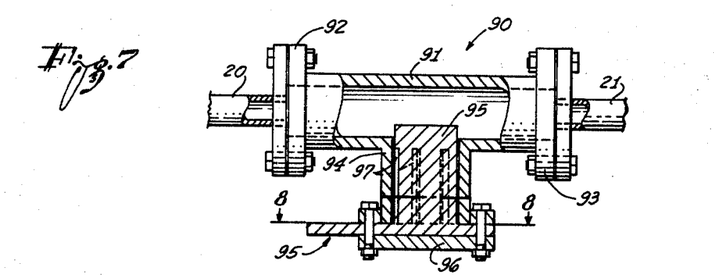
Figure 8:
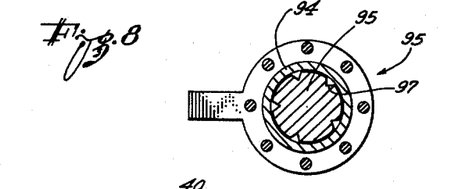
FIGURE 8 illustrates a cross-section taken along the line 8—8 in FIGURE 7.

FIGURE 7 shows another and particularly simple way of providing a corrosion preventing unit 90 in accordance with the invention. Again there is a single pipe or tube 91, preferably having a somewhat larger inner diameter than that of pipelines 21 and 22. Tube 91 is connected to the pipes by means of flanges 92 and 93. The interior of the pipe 91 is covered with an electrically insulating material. There is a branch or cross nipple 94 which communicates with pipe 91 but extends radially away therefrom. Nipple 94 receives an electrode 95 having a cylindrical stem of almost similar diameter as the nipple 94. The electrode has a circular crossplate of relatively large diameter and thus has a T-shaped cross section as shown in FIGURES 7 and 8.

A cover plate 96 with an insulating coating is used to close nipple 94 and to position the electrode 95 by means of suitable bolts. The electrode 95 projects into the interior of pipe 91 for a distance at which the flow area as reduced by the protruding electrode is about equal to the diameter of pipes 20 and 21. From a point just below the interior of pipe 91, the cylindrical portion of electrode 95 is provided with slots 96. Except for the part projecting into the flow space of tube 91, electrode 95 is covered also with insulating material and this will protect the flange part and retards corrosion of the electrode.

The crucial point in all these modifications is that pipe sections 20 and 21 are electrically insulated from each other, and that an electrode insulated from both, dips into the electrolytic fluid to provide an electrolytical contact potential in relation to the material employed as the pipes or bushings, and there is a resistive connection between this electrode and one of the pipe sections. A potential increase in the fluid is established on one side of the electrode and the other insulated section is an equipotential region. It can be seen that the exchange of a new electrode is rather a simple operation. As the plug or cover plate is removed, the electrode will then be unscrewed from plug or cover, and a new magnesium electrode is screwed back to the plug or cover, and the plug or cover is reinserted into the insulating unit.

The embodiment described next illustrates that the electrode other than 15 can be disposed at a location different from the entrance to the insulated tube unit.

Figure 9:
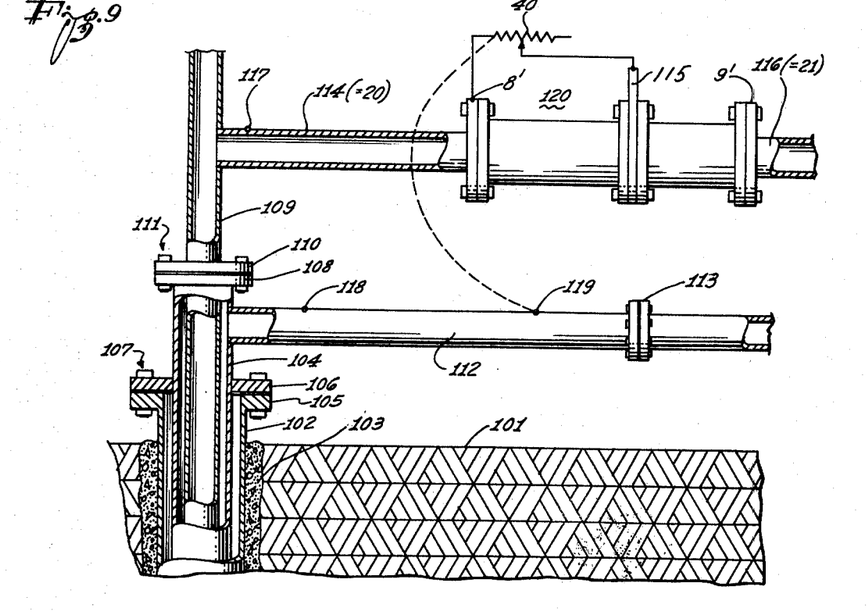
FIGURE 9 illustrates somewhat schematically a pipe system of an oil well using a unit as is shown in FIGURE 1 and illustrating additional corrosion preventing measures.

Referring now to FIGURE 9 which illustrates the various strings of pipe normally found to exist in a producing oil well. The surface of the earth or ground level is shown at 101. A surface pipe 102 is surrounded by a cement jacket 103. The surface pipe 102 is provided with a flange 105. A casing string 104 is also provided with a flange 106 which rests on flange 105 and is secured thereto by bolts 107. The casing 104 is also provided with flange 108. A tubing string 109 through which the produced fluid (oil) reaches the surface is provided with a flange 110 which is secured to casing flange 108 by bolts 111.

A gas line 112 conveys the produced gas to the gathering line and is provided with an insulating flange 113 to break the metallic circuit. The tubing string 109 is connected to a flow line 114, 116 which conveys the produced fluid to the receiving tank (not shown). Inserted in this flow line 114, 116 is an insulating unit 120 which has been described in reference to FIGURE 1, etc.

The casing string 104 rests upon and is suspended within the surface pipe 102 at the flanges 105 and 106, and the tubing string 109 rests upon and is supported by the casing string at the flanges 108 and 110. There will thus develop stress potentials on the casing and tubing and the potentials will depend upon the environment in which they are stressed and the weight and length of the respective strings.

In some instances when the well structure has been insulated by an insulation flange such as 113 and by the insulation unit 120, measurements made with a high resistance voltmeter across the unit 115 (resistor 40 removed) will show the receiving tank side 116 of the flow line is positive to the well head side 114 of said flow line. Measurements made between the flow line 114 at the point 117 and the gas line at the point 118 will show that the casing 104 is positive to the tube string 109. It should be noted here, that the crude oil and more particularly when produced with brine is not an electrical insulator but has electrolytic properties. When such a condition is found to exist it indicates that the stress potential developed on the tubing is occurring in an electrolytic environment of sodium chloride. The tubing is, therefore, anodic to the casing string and current will flow from the casing string into the tubing string.

Should the electrode 15 in unit 120 be connected to flange 8' through the variable resistance 40, the release of electrons, i.e., the interruption of the current through piping 116–114, as described in reference to FIGURE 1 would make the flow line 114 more negative and increase the potential drop between 118 and 117. In order to counter this circulation of long line current it is necessary to exert a counter electromotive force in such a manner as to balance the potentials existing on the casing. The electric current from the casing to the tubing must be eliminated. The current through flow lines 116–114 must be interrupted. In order to obtain both effects, it is suggested to include the casing-tubing as conductors in the load circuit for the control of unit 120 and in a manner that the total current in the casing-tubing current path is substantially zero.

In an actual installation made, it was found that the potential drop across unit 120 was 44 millivolts positive (resistor 40 removed) and the potential drop between 117 and 118 was 0.4 millivolt, point 118 being negative. The latter measurement is a potential drop across a solid metallic conductor of very low resistance and thus indicates a current flow of considerable magnitude between the casing and the tubing.

To eliminate this current flow from the casing to the tubing, the electrode 115, magnesium in this case, was connected through a 200 ohm variable resistance to the gas line at 119. Due to electrolytic action, the electrode as an anode lost electrons through the resistor which were conveyed to the point 119 on the gas line, they then moved as conducting electrons in a metal to the casing 104, up the casing through the flanges 108 and 110, onto the tubing 109, up the tubing and along the flow line 114 to the flange 8', entering into a reaction with the electrolyte at this point with the metal constituting anions, and through the electrolyte to the electrode 15 in unit 120 to complete the circuit.

Where these electrons travel up the casing and onto the flow line their direction of travel is opposite to the normal electron travel from the tubing to the casing. Thus, the electric current as fed from unit 120 into the tubing-casing current path is opposite to the current produced by the stress of the tubing, so that the resulting current in the tubing-casing current path is substantially zero and the potentials at points 118 and 117 become about equal. At the same time, unit 120 did set up its counter EMF to interrupt the current in lines 114–116.

Where before the application of counter electromotive force the potential drop between 118 and 117 was 0.4 millivolt, with 118 positive, by the application of counter electromotive force as above described resulted in a potential drop between 117 and 118 of anywhere from zero to 0.8 millivolt in opposite direction, i.e., with 117 positive depending upon the value of the variable resistance 40. At the same time the ionic field of force surrounding the anode 15 opposed the positive field set up by the flow line 116 which normally was positive to the flow line 114.

With the anode 15 connected directly to the flange 8' through the variable resistance 40, the flow line 114 was made more negative, and the potential drop between 118 and 117 increased from 0.4 millivolt to as high as 1.4 millivolts depending on the value of the resistance 40, which shows the necessity of making the connection as suggested. A high silicon iron anode energized by an external source of direct current could have been used to replace the magnesium anode, in which case the negative terminal of an auxiliary, direct current source (FIGURE 1a) would be attached to the point 119 and the positive terminal of this auxiliary source could be connected through a variable resistance to the electrode.

Other applications of counter electromotive force in this same manner will be found including the application to water tube boilers furnishing steam for injection into oil wells for heating the producing formation where the well structures constitute negative sinks in relation to surface potentials and the ionizing of the gases during phase change in the fire box causes a rise in the potential of the water tubes and by making the feed water line positive in respect to the water tubes before the fluid enters the boiler any tendency to precipitate colloidal or suspended matter will occur before the fluid enters the boiler.

I claim:

1. In combination for preventing corrosion in a pipe system, having first and second pipes for conducting an electrolytic fluid and wherein an external source of electric voltage potential tends to drive a current through the pipes, at more negative potentials for the first pipe, comprising:

means for providing a passageway between said first and second pipes permitting passage of fluid from the first pipe to the second pipe and electrically insulating the first pipe from the second pipe except for the fluid flowing through the passageway; and means including an anode in the passageway electrically connected to the first pipe to assume a more positive potential than imparted upon the anode by the fluid by operation of the external source alone, and in electric isolation from the second pipe except for conductive connection established by the fluid between the second pipe and the anode for imparting to the fluid as it passes through said passageway a particular voltage potential drop effective in the fluid as potential barrier opposing the potential difference as externally applied to the fluid in said first and second pipes, so as to substantially prevent the flow of electric current from one of the pipes to the other one in the fluid contained in the pipes.

2. In combination with a pipe system, having first and second pipes for conducting an electrolytic fluid and wherein an external source of electric voltage potentials tends to drive a current through the pipes, the first pipe being more negative than the second pipe, comprising:

anode means positioned in the fluid and insulated from at least one of said pipes except for connection through the fluid; and electric circuit means externally connected to said first pipe and to said anode means, to impart upon the anode means potential more positive than imparted upon it by the fluid by operation of the external source, and independently therefrom to establish and maintain a particular potential in the fluid around the electrode means preventing the flow of current from the fluid in one of the pipes to the fluid in the other pipe.

3. The combination set forth in claim 2, including an insulated conduit means fluid conductively connected to said first and second pipes and having a lateral aperture closed by a cover means, said anode means being removably secured to said cover means.

4. The combination set forth in claim 2 including first and second insulated conduit means respectively connected to said first and second pipes and positioned coaxially to each other, said anode means being sandwiched in between said first and second conduit means.

5. In combination with a pipe system having first and second pipes for conducting an electrolytic fluid and wherein an external source of electric voltage potential tends to drive a current through the pipes, comprising:

means for providing an electrically insulating passageway between said first and second pipes and permitting passage of fluid from the one of said pipes to the other one;

first and second spaced electrode means establishing in the said insulated passageway a first particular region, at least said first electrode being insulated from said first and second pipes, said first particular region extending from said first electrode towards said first pipe, there being a second particular flow region between said first electrode and said second pipe; and circuit means externally interconnecting said first and second electrodes rendering the first electrode anodic relative to the second electrode, the circuit means in cooperation with the first and second electrode means establishing a bucking voltage opposing the voltage provided by the source to provide a potential drop in said first particular region resulting in a substantially uniform potential in said second particular region.

6. In combination with a pipe system as set forth in claim 5, said second electrode being electrically connected to said first pipe.

7. In combination with a pipe system as set forth in claim 5, said second electrode being electrically insulated from said first pipe and positioned between said first pipe and said first electrode, to define a third particular region in the fluid as part of the first region and particularly between the first pipe and the first electrode, said third region having substantially uniform potential when said second region has substantially uniform potential, at a different potential level.

8. A pipe system including first, second and third pipes, constituting a mechanically uniform structure, at least said first and second pipes being passed through by an electrolytic fluid, there being a source of different external, electrical potentials effective in each of said pipes comprising:

means for electrically insulating said first and second pipes but permitting passage of fluid from one of said first and second pipes to the respective other one and thereby defining an electrically insulated passageway;

electrode means immersed in the fluid for defining a particular potential in a fluid region in said passageway; and circuit means for controlling said particular potential of said electrode means to operate as an anode independent from the source, at a potential more positive than the potential imparted upon the electrode means by the fluid in the absence of the circuit means, to thereby establish a potential barrier blocking electric current flow between said first and second pipes through the fluid in the passageway, said circuit means including said first and third pipes to establish a current path therethrough to equalize the potential difference between said first and third pipes.

9. In a pipe system having different branches of electrically interconnected pipes at least partially communicating with each other for fluid flow, there being different sources of voltage potentials driving electric currents through the several branches, comprising:

an insulating conduit means inserted in one of the branches in which are effective sources of different voltage potentials;

first means in said insulating conduit means including an anode and producing a voltage at least partially independently from the sources for introducing into the fluid as it passes through the conduit means a current which results in a voltage potential barrier preventing the flow of current in said one branch; and means included in said first means to close a current path for said introduced current, through a second branch of said pipe system to oppose the flow of current introduced in said second branch by at least one further source of voltage potential.

10. In combination with a pipe system having first and second pipes for conducting an electrolytic fluid and wherein an external source of electric voltage potential tends to drive a current through the pipes, comprising:

means for providing an electrically insulating passageway between said first and second pipes and permitting passage of fluid from the one of said pipes to the other one;

first and second electrode means in said fluid, spaced apart for a region in the fluid at least partially included in said passageway whereby the first electrode is closer to the first than to the second pipe and the second electrode is closer to the second pipe than to the first pipe, said electrode means being of materials different in the electromotive force series, and being oriented so that the first electrode is more on the negative side of the series in relation to second electrode; and resistive means interconnecting externally said electrode means and having value so that an electric current between the electrodes establishes a potential drop in the liquid in the region between the electrodes preventing current flow between the pipes through the passageway.

11. In combination with a pipe system, having first and second pipes for conducting an electrolytic fluid and wherein an external source of electric voltage potential tends to drive a current through the pipes, comprising:

an electrically insulating passageway for the passage of fluid between said first and second pipes interrupting the electrical connection between said first and second pipes except for the contiguous fluid contacting said pipes internally and passing through said passageway;

an electrode in the fluid in said passageway insulated from either pipe and permitting external electrical connection, said electrode providing an ionic field in the fluid of particular polarity; and circuit means connected to said electrode to establish a potential for said electrode and for said ionic field more positive than the potential established by operation of the fluid and the source in the absence of the circuit means, independently from said source and substantially equal to the potential of the fluid at said first pipe and to maintain a flow of charged particles between said electrode and said second pipe through said fluid in the passageway, to establish a change in potential in the fluid from the level in said first pipe towards the potential of the liquid in said second pipe as resulting from said external source.

12. Corrosion preventing device for a pipe line through which passes an electrolytic fluid and in which is effective a voltage driving an electric current through the fluid in the pipe line;

conduit means having an inner electrically insulating surface and having an inlet and an outlet;

first and second pipe means including inner electrically conductive metallic surface portions respectively connected to said inlet and outlet to establish a contiguous pipe line;

an electrode of a material which is different from said metallic surface portions with reference to the EMF series so that upon passage of an electrolytic fluid through said pipe means and said conduit means, two galvanic cells are established of oppositely oriented polarity, the electrode operating externally as the negative pole for each of them; and resistive means for electrically interconnecting said electrode with one of said pipe means so that an EMF is operative between said first and second pipe means opposite and substantially equal to the said driving voltage.

13. A method of preventing corrosion in first and second pipes which pass fluids having charged particles where the second pipe is downstream from the first pipe;

determining the flow of charged particles through the first and second pipes with the flow of fluid through the pipes;

insulating the first from the second pipe;

raising the potential in the insulated region between the first and second pipes thereby introducing a bucking voltage at a potential gradient in the fluid in between said first and second pipes to oppose the flow of an electric current through the fluid from one of said pipes to the respective other one of said pipes; and adjusting the raising of the potential and the value of the potential gradient to a value substantially inhibiting the flow of electric current in the liquid as between the first to second pipes.

14. A method of preventing corrosion in first and second pipes which pass fluids having charged particles, where the second pipe is downstream from the first pipe;

providing an electrically insulated fluid passage between the first and second pipes and in the stream of the fluid passing through the pipes;

providing an auxiliary electric current path in the fluid which includes an anode therein;

closing said current path externally to raise the potential of the anode to establish an internal potential drop in the region of insulation equivalent to a bucking voltage;

measuring the effect of the current in the auxiliary current path to determine the potential drop as produced; and varying the current flow in the auxiliary current path to provide a potential drop corresponding to the voltage between the first and second pipes.

15. The method as set forth in claim 14, for use in an oil well having a casing and a tubing which includes the first and second pipes, and wherein the tubing is at a different electrical potential to the casing, including the step of including the casing in the external current path to balance the difference in the electrical potential between the tubing and the casing.

16. A method of preventing corrosion in first and second pipes which pass fluids having charged particles, insulating said first and second pipes from each other except for connecting through the fluid;

disposing an electrode between the first and second pipes and in the stream of the fluid passing through the pipes;

providing an external electric current path to the electrode to operate the electrode as an anode independently from a parasitic voltage source for raising the potential of the electrode relative to the pipe of the first and second pipes which is more negative than the respective other one by operation of the parasitic source;

measuring the effect of the electric current in the current path to determine the potential of the electrode in the fluid as opposing the flow of charged particles through the pipes; and varying the current in the electrode to establish a potential barrier inhibiting the flow of electric current from one pipe to the other one through the fluid.

17. In combination for preventing corrosion in first and second pipes which pass fluid having charged particles where the second pipe is downstream from the first pipe with respect to the flow of fluid;

electrically conductive means disposed between the first and second pipes and in the fluid stream and having potential differences relative to the first and second pipes, the electrical conductive means being made from a material to produce a particular potential, different from the potential on the first and second pipes, and to provide for an environmental potential in the fluid more positive relative to said particular potential;

means including insulating fluid conductive means interconnecting the first and second pipes, the electrically conductive means disposed within liquid conducting space of the insulating means;

means connected between the electrical conductive means and the more negative one of the first and second pipes outside of the liquid flow between the pipes for changing the potential of the liquid as contacted by the electrical conductive means; and means included in the last mentioned means and having adjustable characteristics for providing adjustments in the change of potential of the liquid as contacted by the electrically conductive means to block the flow of electric current between the first and second pipes.

18. In combination with a pipe system, having first and second pipes for conducting an electrolytic fluid and wherein an external source of electric voltage potential tends to drive a current through the pipes, the first pipe being more negative than the second pipe, comprising:
   means for providing a fluid passageway between said first and second pipes electrically insulating the first from the second pipe and permitting passage of fluid from one of said pipes to the other one;
   a first electrode positioned to contact the fluid at a first location closer to the first pipe than the first pipe is positioned to the second pipe;
   an anode positioned in fluid contact and spaced apart from but closer to the second pipe than the first electrode is positioned to the second pipe, the region of fluid between the first electrode and the anode being at least partially included in said passageway; and
   means connected to the first electrode and to the anode to produce a voltage independently from the external source in cooperation with the anode to raise the potential of the anode and being adjusted to establish a potential gradient in the fluid between said electrode and anode as bucking voltage opposite to and substantially equal to the concurrently existing voltage between said first and second pipes across the insulated passageway by operation of said source.

19. In combination with a pipe system as set forth in claim 18, said first electrode and said anode comprising materials different in the electromotive force series, said establishing means being a resistor interconnecting the first electrode and the anode external to the liquid.

20. In combination with a pipe system as set forth in claim 19, said anode comprising substantially magnesium, said first electrode comprising substantially iron.

21. In combination with a pipe system as set forth in claim 18, at least said anode having a tongue extending in said passageway toward the first electrode in a direction parallel to the flow of liquid.

22. In combination with a pipe system as set forth in claim 18, said establishing means being an external voltage source connected between said first electrode and said anode.

23. In combination with a pipe system as set forth in claim 18, said anode being connected to be separated from either pipe, the first electrode forming a part of said first pipe.

24. The combination set forth in claim 23 for use in an oil well having a tubing which includes said first and second pipes, and further having a casing, where the tubing is at a different potential than the casing such that corrosion is produced in the tubing,
   said establishing means being connected to include portions of the tubing and of the casing in its current path at an orientation of current flow to minimize any difference in the potential between the tubing and the casing and minimize the production of corrosion in the tubing.

25. In combination with a pipe system having first and second pipes for conducting an electrolytic fluid and wherein an external source of electric voltage potentials tends to drive a current through the pipes thereby establishing particular potentials in the fluid and in the pipes, the first pipe having more negative potential than the second pipe;
   first means fluid conductively interconnecting the first and the second pipe but electrically insulating them from each other except for the fluid flowing between the pipes through the first means;
   second means including an anode in the first means contacting the fluid in the first means; and
   third means connected to the anode, to cause an EMF to be effective in the liquid between the first pipe and the anode thereby raising the potential of the anode above the potential imparted upon it by the fluid and including means adjusted to obtain in the liquid in the first means a particular voltage between the anode and the first pipe opposite equal voltage of the driving source.

26. The combination set forth in claim 25, the third means including a resistor connected between the anode and a point electrically connected to the first pipe, the anode functioning as an anode by operation of its EMF in relation to the material of the first pipe.

27. The combination as set forth in claim 25, the third means including a voltage source connected between the anode and a point electrically connected to the first pipes, other than through the liquid between the anode and the second pipe.

28. In combination for use in an oil well having a casing and a tubing disposed in the casing where the tubing is at a different potential than the casing such that corrosion is produced in the tubing and where the tubing is provided for providing for a flow of fluid through the tubing to facilitate the operation of the oil well, and where a potential difference exists along the tubing tending to produce corrosion in the means for providing for the flow of the fluid;
   an electrically insulated section included in the tubing and interrupting the electric current path as provided by the tubing except for the liquid as it passes through the section;
   an anode positioned in the section in contact with the liquid flowing therein;
   electrical circuit means connected to the tubing, to the casing and to the anode for raising the potential of the anode to inhibit the flow of charged particles through the tubing and to reduce the production of a voltage difference between the tubing and the casing; and
   adjustable means connected in the electrical circuit means for adjusting the action of the electrical circuit means and of the anode in inhibiting the flow of charged particles through the conduit means, to minimize such flow of charged particles and for inhibiting the production of a voltage difference between the tubing and the casing to minimize such production.

29. In combination for preventing corrosion in a pipe system, having first and second pipes for conducting an electrolytic fluid and wherein an external source of electric voltage potential tends to drive a current through the pipes, at more negative potentials of the first pipe, comprising:
   means for providing a passageway between said first and second pipes permitting passage of fluid from the first pipe to the second pipe and electrically insulating the first pipe from the second pipe except for the fluid flowing through the passageway; and
   means including an anode in the passageway and electrically connected to the first pipe to produce a voltage independently from the source, and raising the anode potential to impart to the fluid as it passes through the passageway, a potential barrier referenced against the potential of the first pipe so as to prevent said source to drive an electric current through the pipes and the passageway.

30. In combination with a first and second pipe for conducting fluid, there being a parasitic voltage source driving corroding current through the liquid and between the first and second pipe, the first pipe being negative relative to the second pipe;
   means defining a liquid passageway between the first and second pipe and insulating the first pipe from the second pipe except for the current path established by liquid in the passageway;
   an anode placed in the passageway in contact with the liquid therein;
   circuit means including the anode to complete a circuit which includes a current path through the liquid from the anode toward the first pipe and which circuit is closed external to the liquid under exclusion of the second pipe; and means included in the circuit means for producing a voltage in said circuit operating as potential gradient in said path for opposing the voltage from the source to prevent current flow from the second to the first pipe through the liquid in the passageway.

31. The combination as set forth in claim 30, the circuit including the first pipe, the voltage being produced as between the first pipe and the anode and adjusted to provide essentially zero voltage between the anode and the second pipe.

References Cited
UNITED STATES PATENTS

| | | | |
|---|---|---|---|
| 999,108 | 7/1911 | Hickey | 204—197 |
| 1,608,709 | 11/1926 | Van Mills | 204—148 |
| 1,804,078 | 5/1931 | Baden | 204—197 |
| 2,076,422 | 4/1937 | Zimmerer et al. | 204—196 |
| 2,076,466 | 4/1937 | Koerber | 204—196 |
| 2,762,767 | 9/1956 | Mosher et al. | 204—147 |
| 2,809,699 | 10/1957 | Battle | 204—196 |
| 2,910,421 | 10/1959 | Sabins | 204—197 |
| 3,220,942 | 11/1965 | Crites | 204—196 |
| 3,347,768 | 10/1967 | Clark et al. | 204—196 |

JOHN H. MACK, Primary Examiner

T. TUNG, Assistant Examiner

U.S. Cl. X.R.

204—148, 196, 197